(12) United States Patent
Stanley

(10) Patent No.: US 9,943,193 B2
(45) Date of Patent: Apr. 17, 2018

(54) EMERGENCY SHOWER WITH IMPROVED VALVE ACTUATION

(71) Applicant: Haws Corporation, Sparks, NV (US)

(72) Inventor: Stephen Lee Stanley, Sun Valley, NV (US)

(73) Assignee: Haws Corporation, Sparks, NV (US)

( * ) Notice: Subject to any disclaimer, the term of this patent is extended or adjusted under 35 U.S.C. 154(b) by 280 days.

(21) Appl. No.: 14/881,727

(22) Filed: Oct. 13, 2015

(65) Prior Publication Data

US 2017/0100000 A1    Apr. 13, 2017

(51) Int. Cl.
| | |
|---|---|
| A47K 3/00 | (2006.01) |
| A47K 1/04 | (2006.01) |
| A61H 33/04 | (2006.01) |
| E03B 1/00 | (2006.01) |
| B05B 1/30 | (2006.01) |
| A47K 3/28 | (2006.01) |
| F16K 3/22 | (2006.01) |
| F16K 31/60 | (2006.01) |

(52) U.S. Cl.
CPC .............. *A47K 3/286* (2013.01); *F16K 3/22* (2013.01); *F16K 31/60* (2013.01)

(58) Field of Classification Search
USPC .............................. 4/615; 137/615; 239/569
See application file for complete search history.

(56) References Cited

U.S. PATENT DOCUMENTS

| | | | |
|---|---|---|---|
| 1,165,705 A | 12/1915 | Perkins | |
| 1,203,874 A | 11/1916 | Hilfiker | |
| 1,354,838 A | 10/1920 | Perkins | |
| 3,273,172 A | 9/1966 | Wilks | |
| 3,493,977 A | 2/1970 | Green | |
| 3,884,258 A | 5/1975 | Mull | |
| 4,989,791 A | 2/1991 | Ridenour | |
| 5,768,721 A * | 6/1998 | Kersten | A47K 3/286 4/596 |
| 7,082,627 B2 * | 8/2006 | Marrs | A47K 3/286 251/229 |
| 7,243,381 B2 * | 7/2007 | Lutz, II | G05D 23/1393 4/620 |
| 8,024,822 B2 * | 9/2011 | Macan | E03C 1/066 4/615 |

(Continued)

*Primary Examiner* — Christine Skubinna
(74) *Attorney, Agent, or Firm* — Lowry Blixseth LLP; Scott M. Lowry

(57) ABSTRACT

The emergency shower includes a discharge outlet pivotable between a first non-use position and a second deployed position about a rotary union, for dispensing water therefrom. A ball valve is positionable between a first flow restricting position and a second flow permitting position, when the discharge outlet pivots between the first non-use and second deployed positions. A linkage system actuates ball valve movement when the discharge outlet pivots, by way of a first link pivotally coupled relative to the discharge outlet and movable therewith and a second link pivotally coupled with the ball valve and responsive to movement of the first link, the second link positions the ball valve in the first flow restricting position when the discharge outlet is in the first non-use position and commensurately moves the ball valve to the second flow permitting position when the discharge outlet pivots to the second deployed position.

24 Claims, 12 Drawing Sheets

(56) References Cited

U.S. PATENT DOCUMENTS

| | | | |
|---|---|---|---|
| 2006/0196563 A1 | 9/2006 | Liles | |
| 2007/0169262 A1* | 7/2007 | McDonald | E03C 1/021 4/615 |
| 2012/0073043 A1* | 3/2012 | Jaworski | B05B 1/3421 4/620 |
| 2014/0047633 A1* | 2/2014 | Strandberg | A61H 35/02 4/620 |
| 2015/0369382 A1* | 12/2015 | Paul | E03C 1/0408 422/38 |

* cited by examiner

//EMERGENCY SHOWER WITH IMPROVED VALVE ACTUATION

BACKGROUND OF THE INVENTION

The present invention generally relates to an emergency shower with an improved valve actuation mechanism. More specifically, the present invention relates to an emergency shower having a linkage activation system for pivoting a ball valve between closed and open positions in response to pivoting the shower head from a generally vertical non-use position to a generally horizontal deployed position, and wherein the shower head disconnects from a wall clip to remain in the general horizontal deployed position after activation.

As part of the Occupational Safety and Health Act of 1970, the United States government formed the Occupational Safety and Health Administration ("OSHA") to create and adopt standards and regulations for maintaining safe workplace conditions. In this respect, OSHA has, over the years, adopted regulations that require the use of wash stations (e.g., emergency eyewash and/or emergency shower stations) so workers can quickly wash and otherwise rinse away harmful or hazardous chemicals, especially in an emergency. Such wash stations may include an overhead shower unit for delivering a generally continuous stream of water from overhead and/or a lower eyewash unit for flushing contaminants from the eyes. Such equipment may be installed along walls, hallways, or corridors, may be free standing or connected adjacent to a wall, and are preferably coupled to a mains water supply. Preferably, the emergency wash stations are placed near contaminants or hazards (e.g., just inside a laboratory) and away from other obstructions that may prevent or obstruct immediate access to the wash station.

Emergency showers known in the art may be activated by pulling down on a hanging cord that couples with, e.g., a lever in rotatable relation with a valve that moves between open and closed positions with movement of the lever. These products typically require full downward displacement of the hanging cord to fully open the valve. Other designs may partially open the valve with partial downward displacement of the hanging cord. Consequently, in these designs, the flow rate may be undesirably low. Preferably, the emergency shower valve is opened all the way to continuously emit at least around 20-60 gallons (75-230 liters) per minute for at least 15 minutes to ensure the user has plenty of time to rinse any harmful contaminants. If the user releases the hanging cord before full extension, the showerhead may release a less than desirable quantity of water. This may be particularly undesirable in the event the user needs to immediately and continuously use both hands to properly use the wash station, for example to open their eyes for proper flushing. If the showerhead valve does not fully open, the user would need to again find and pull the cord downwardly to more fully open the overhead flow of water dispensing from the showerhead. The obvious drawback is that the user must successfully fully open the cord connected to the lever arm to activate the maximum and desired flow of water from the shower head.

There exists, therefore, a significant need in the art for an emergency shower that includes an improved valve actuation mechanism including a linkage system coupling pivoting movement of the shower head arm to activation of water flow by way of a ball valve, wherein initial release of the shower head results in continuous and full water flow and maintains the shower head in the full deployed position without continued displacement of the downwardly hanging pull cord. The present invention fulfills these needs and provides further related advantages.

SUMMARY OF THE INVENTION

In one embodiment, the emergency shower with improved valve actuation as disclosed herein includes a shower head arm pivotable between a first non-use position and a second deployed position for dispensing water out from a shower head over a user underneath. A rotary union coupled relative to the shower head arm facilitates pivotable movement of the shower head arm between the first non-use position and the second deployed position by way of a rotor in fluid communication with the shower head arm on one side and fluidly coupled within the rotary union housing on the other, the rotor pivoting about an internal and water-tight bearing system. Furthermore, the emergency shower includes a ball valve positionable between a first flow restricting position when the shower head arm is in the first non-use position and a second flow permitting position when the shower head arm pivots about the rotary union to the second deployed position. A linkage system activates movement of the ball valve in response to movement of the shower head arm between the first non-use and second deployed positions. Specifically, the linkage system may include a first link pivotally coupled relative to the shower head arm and movable therewith between the first non-use position and the second deployed position. The linkage system may further include a second link pivotally coupled with the ball valve and responsive to movement of the first link with the shower head arm. Through such movement, the second link positions the ball valve in the first flow restricting position when the shower head arm is in the first non-use position and commensurately moves the ball valve to the second flow permitting position when the shower head arm is pivoted to the second deployed position.

One of the first link or the second link may include a tab that pivots relative to and selectively engages a ledge designed to terminate pivoting movement of the shower head arm from the first non-use position to the second deployed position. In this respect, the tab may be an inwardly projecting tab configured to engage a ledge generally aligned along the length of the shower head arm, wherein a planar base of the ledge is generally horizontal when it contacts the tab in the second deployed position. In this respect, the projecting tab and the ledge may be rotatably offset by approximately 90 degrees when the shower head arm is in the first non-use position.

Additionally, one of the first link or the second link may be pivotally coupled relative to an extension bracket generally parallel with the rotary union. Here, the extension bracket may extend outwardly from a vertical fluid conduit or may extend inwardly from the shower head arm. In another aspect of this embodiment, the rotary union may be generally positioned perpendicular to the shower head arm in both the first non-use position and the second deployed position, wherein the extension bracket moves commensurately relative to the rotary union to maintain its parallel relationship therewith between the first non-use and second deployed positions. To facilitate such movement, the first link may pivot clockwise and the second link may pivot counterclockwise, with movement of the shower head arm from the first non-use position to the second deployed position, and vice versa when moving from the second deployed position to the first non-use position.

The shower head arm may be maintained in the non-use position, such as a generally vertical position, by a restraint. Such a restraint may include, in one embodiment, a spring (e.g., an extension spring) coupled between the shower head arm and a base surface, such as a nearby wall. The spring generally biases the shower head arm in the first non-use position and resists movement to the second deployed position, such as by way of downward displacement of a pull cord. When in the deployed position, tension from the spring attempts to draw the shower head arm back up into the non-use position. This, of course, requires a constant downward force, such as by way of the pull cord, to maintain the shower head arm in the second deployed position. Alternatively, the restraint may include a clamp that retains the shower head arm in the first non-use position and selectively releases the shower head arm for deployment to the second deployed position, such as when the pull cord is displaced downwardly. The clamp may include a U-shaped grip having a deformable inner diameter relatively smaller than an outside diameter of the shower head arm. Preferably, the inner diameter includes a non-slip surface. In this embodiment, the shower head arm moves to and stays in the generally horizontal second deployed position after being released from the U-shaped grip.

In another aspect of this embodiment, the emergency shower may be formed wherein at least a portion of the shower head arm includes the ball valve. That is, the ball valve may be formed in line with the shower head arm. In another aspect, the rotary union may be positioned intermediate the ball valve and the shower head arm. Here, the ball valve may be in line with a vertical fluid conduit. In another aspect, the emergency shower may also include an inlet that selectively couples to a mains water supply and is in fluid communication with the shower head arm, the rotary union, and the ball valve.

In another embodiment, the emergency shower with improved valve actuation disclosed herein may include a discharge outlet pivotable between a first non-use position and a second deployed position for dispensing water out through a shower head. A rotary union generally perpendicularly coupled relative to the discharge outlet facilitates such pivoting movement thereof between the first non-use position and the second deployed position. The emergency shower further includes a ball valve positionable between a first flow restricting position when the discharge outlet is in the first non-use position and a second flow permitting position when the discharge outlet pivots to the second deployed position. Furthermore, a linkage system links movement of the discharge outlet to select positioning of the ball valve. In this respect, the linkage system includes a first link that pivotally couples relative to the discharge outlet and is movable clockwise therewith between the first non-use position and the second deployed position. A second link pivotally couples with the ball valve and is responsive to movement of the first link with the discharge outlet in a counterclockwise direction between the first non-use position and the second deployed position. The second link positions the ball valve in the first flow restricting position when the discharge outlet is in the first non-use position and commensurately moves the ball valve to the second flow permitting position when the discharge outlet is pivoted to the second deployed position. Preferably, one of the first link or the second link pivotally couples relative to an extension bracket generally parallel with the rotary union. An inlet may selectively couple to a mains water supply and be in fluid communication with the discharge outlet, the rotary union, and the ball valve. In one embodiment, the rotary union is positioned intermediate the ball valve and the discharge outlet. Alternatively, at least a portion of the discharge outlet may include the ball valve.

A tab extending out from one of the first link or the second link pivots relative to and selectively engages a stop. Engagement of the tab with the stop terminates pivoting movement of the discharge outlet in the second deployed position. In one embodiment, the tab and the stop may be rotatably offset by approximately 90 degrees when the discharge outlet is in the first non-use position. A clamp may retain the discharge outlet in this first non-use position generally at about a 90 degree angle relative to the second deployed position. The clamp then selectively releases the discharge outlet for deployment to the second deployed position in response to, for example, downward movement of a pull cord coupled to the shower head arm. Here, the weight of the discharge outlet may help pivot it from the first non-use position to the second deployed position. More specifically, the clamp may include a U-shaped grip having a deformable inner diameter relatively smaller than an outside diameter of the discharge outlet. The deformable inner diameter may further include a non-slip surface. Alternatively, an extension spring may bias the discharge outlet in the first non-use position and resist movement to the second deployed position.

In another alternative embodiment, the emergency shower with improved valve actuation as disclosed herein includes a shower head arm pivotable between a first non-use position and a second deployed position for dispensing water out therefrom. A rotary union may couple relative to the shower head arm to permit pivotable movement thereof between the first non-use position and the second deployed position. A ball valve may also be positionable between a first flow restricting position, when the shower head arm is in the first non-use position, and a second flow permitting position, when the shower head arm pivots about the rotary union to the second deployed position. A related linkage system may include a first link pivotally coupled relative to the shower head arm and movable therewith between the first non-use position and the second deployed position and a second link pivotally coupled with the ball valve and responsive to movement of the first link with the shower head arm. The second link positions the ball valve in the first flow restricting position when the shower head arm is in the first non-use position and commensurately moves the ball valve to the second flow permitting position when the shower head arm is pivoted to the second deployed position. One of the first link or the second link may be pivotally coupled relative to an extension bracket generally parallel with the rotary union. A clamp retains the shower head arm in the first non-use position and selectively releases the shower head arm for deployment to the second deployed position. Furthermore, an inlet may selectively couple to a mains water supply and be in fluid communication with the shower head arm, the rotary union, and the ball valve.

In another aspect of this embodiment, one of the first link or the second link may include a projecting tab that pivots relative to and selectively engages a ledge that terminates pivoting movement of the shower head arm at the second deployed position. The first link may pivot clockwise and the second link may pivot counterclockwise with movement of the shower head arm from the first non-use position to the second deployed position. Additionally, the projecting tab and the ledge may be rotatably offset by approximately 90 degrees when the shower head arm is in the first non-use position. The clamp may include a U-shaped grip having a deformable inner diameter relatively smaller than an outside diameter of the shower head arm, wherein the inner diameter includes a non-slip surface. The rotary union may be generally positioned perpendicular to the shower head arm in both the first non-use position and the second deployed position. The rotary union may also be positioned intermediate the ball valve and the shower head arm, or at least a portion of the shower head arm may include the ball valve.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
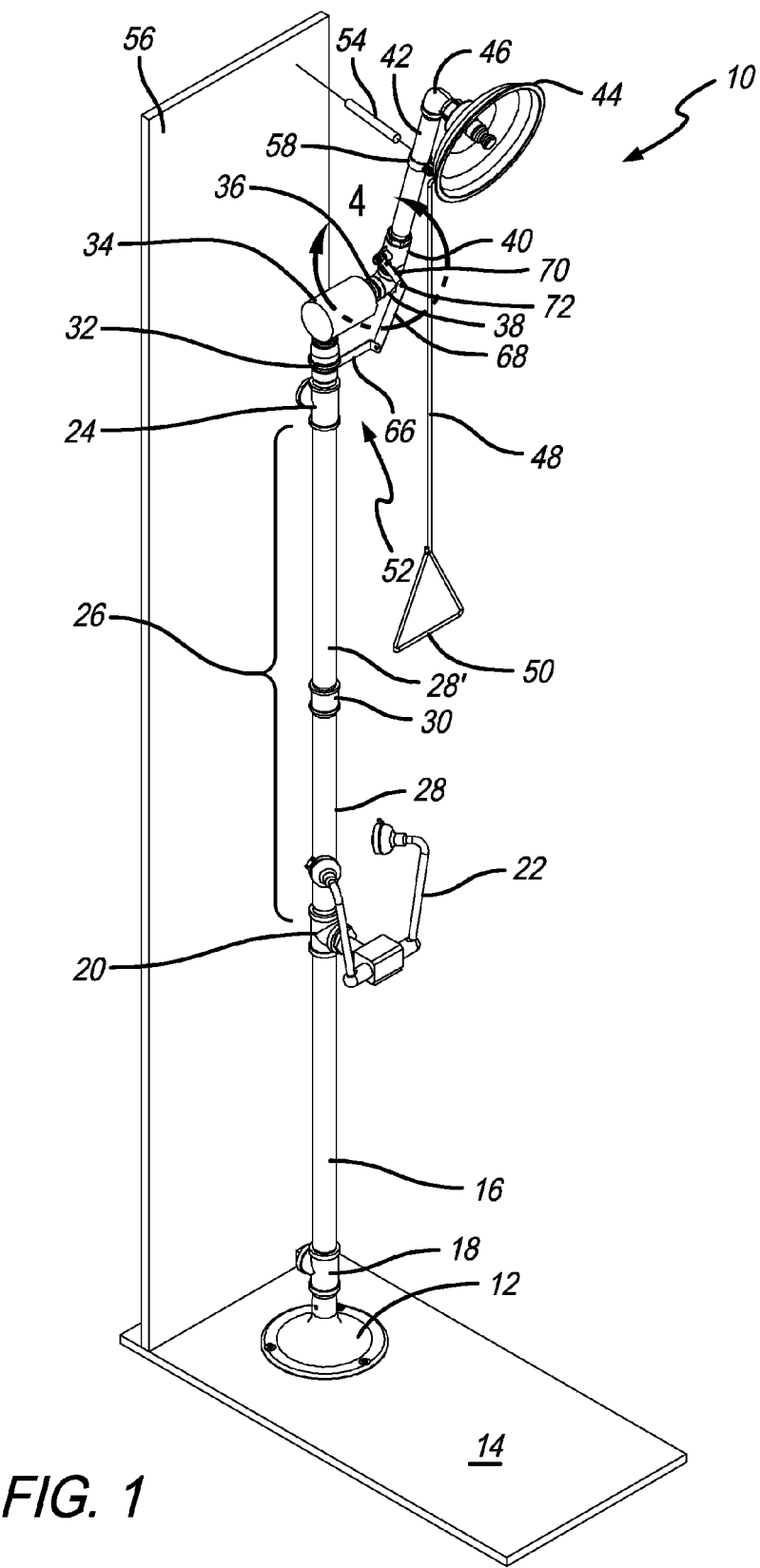
FIG. 1 is a perspective view of one embodiment of an emergency shower with improved valve actuation as disclosed herein, illustrating a shower head arm in a first spring-biased non-deployed position.
Figure 2:
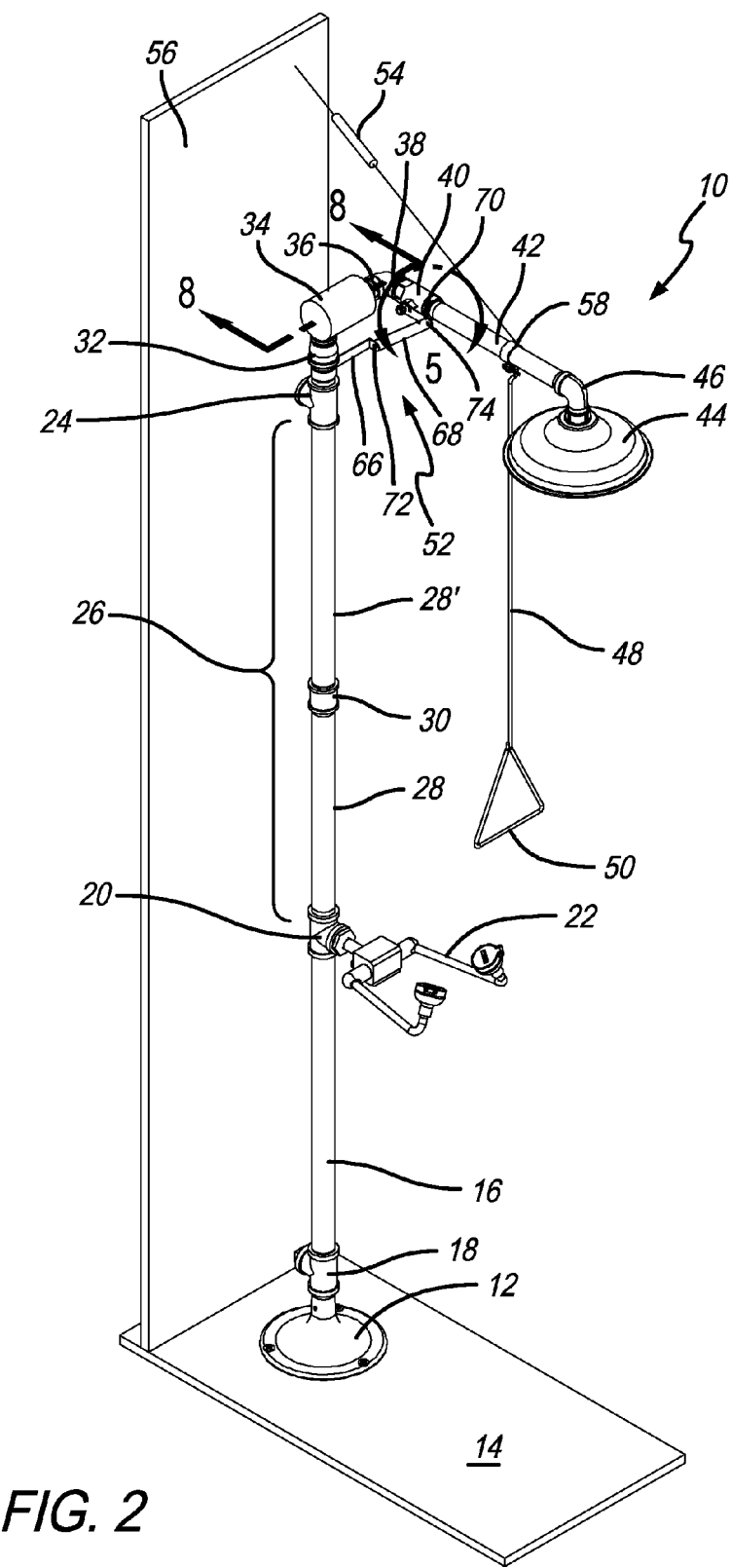
FIG. 2 is a perspective view of the emergency shower of FIG. 1, illustrating the shower head arm pivoted into a second deployed position.
Figure 3:
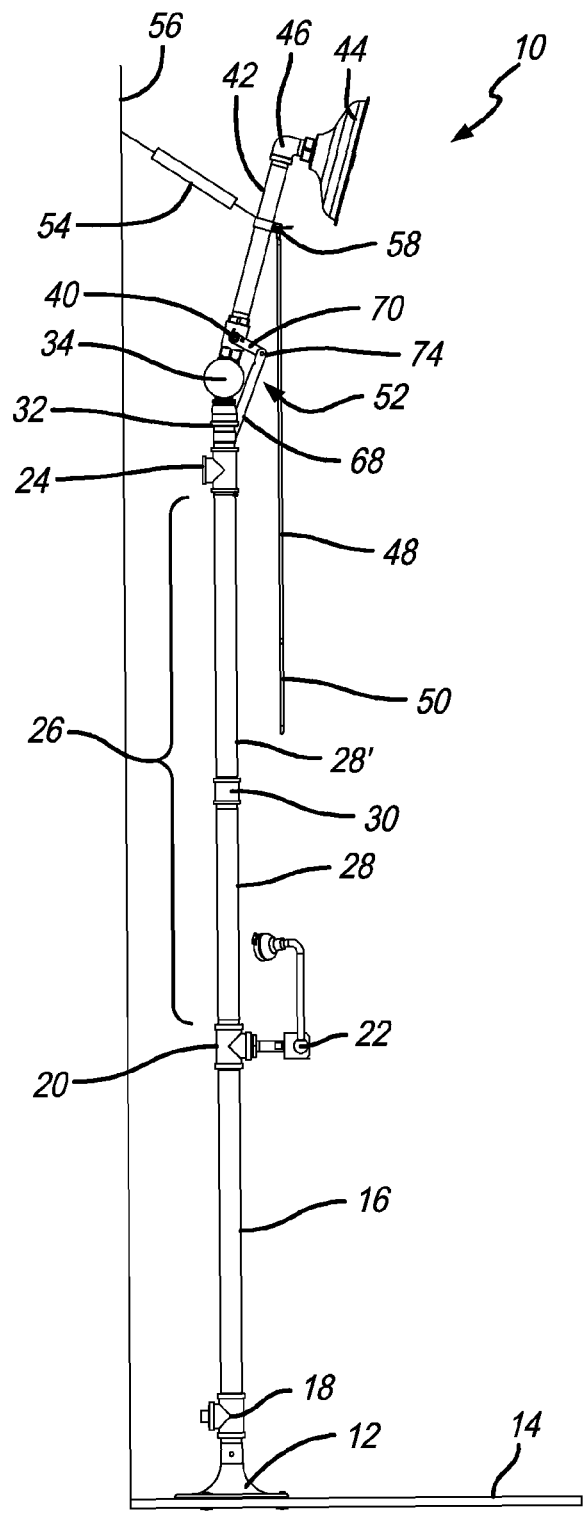
FIG. 3 is a side view of the emergency shower of FIG. 1.

As shown in the exemplary drawings for purposes of illustration, an emergency shower with improved valve actuation as disclosed herein is referred to generally in FIGS. 1-3 by the reference numeral 10 and in an alternative form in FIGS. 9-12 by the reference numeral 10'. As shown in FIGS. 1-3, the emergency shower 10 is a generally vertically free-standing unit that includes a base 12 that may bolt or otherwise attach to a floor surface 14 by way of one or more bolts or the like. Extending from the base 12 is a vertical pipe 16 having a generally T-shaped and optional bottom inlet 18 for selectively coupling to a water source to provide water to the emergency shower 10, 10'. Connected to the top of the optional bottom inlet pipe 16 in fluid flow relation is a generally T-shaped coupler 20 having an eyewash unit 22 extending therefrom as shown in FIGS. 1-3. The eyewash unit 22 is in fluid communication with an inlet 24 by way of a vertical extension pipe 26 that may include one or more pipe sections 28 connected together in fluid flow relationship by one or more corresponding couplers 30. In the embodiment shown in FIG. 1, the emergency shower 10 includes two pipe sections 28, 28', with the pipe section 28' coupling at one end to the T-shaped inlet 24 for receiving an inflow of pressurized water from, e.g., a mains water supply, and coupling to the coupler 30 at the other end. A second pipe section 28 connects to the coupler 30 at one end and the T-shaped coupler 20 at the other end. This way, water entering the emergency shower 10 through the inlet 24 can travel down to the eyewash unit 22 for pressurized actuation and dispensing therefrom. For example, when the emergency shower 10, 10' is activated, e.g., by way of pivoting the eyewash unit 22 to the position shown in FIG. 2, water pressure within the vertical extension pipe 26 may transfer to the T-shaped coupler 20 and out through the now open eyewash unit 22. Of course, the eyewash unit 22 may be pivoted back to the position shown in FIGS. 1 and 3 to stop the flow of water out therefrom.

As briefly mentioned above, the inlet 24 couples at one end to the pipe section 28' for delivering pressurized water flow to the lower portion of the emergency shower 10 by way of the vertical extension pipe 26. On an opposite side, the inlet 24 couples to a relatively short adapter 32 that includes a pipe fitting on one end for engagement with the inlet 24 in pressurized fluid flow relation, and another fitting on an opposite end that couples to a rotary union 34 that extends generally perpendicular relative to the vertical extension pipe 26. The rotary union 34 includes a rotor 36 (e.g., made from stainless steel) having a threaded end extending out from the body of the rotary union 34 for threaded engagement with an elbow 38 that couples with a ball valve 40 in line within a shower head arm 42. The ball valve 40, as discussed in more detail below, pivots between closed and open positions to respectively restrict or permit water flow through the shower head arm 42. The shower head arm 42 terminates into a shower head 44 about a downturned elbow 46. The shower head 44 dispenses water from the emergency shower 10, 10' in accordance with the embodiments disclosed herein when the shower head arm 42 is pivoted from the non-use position (FIGS. 1 and 3) to the use position (FIG. 2), such as by way of pulling down on a downwardly hanging pull cord 48. In the embodiments disclosed herein, the pull cord 48 may terminate in a triangular handle 50 shown in FIGS. 1-2 and 9-10. But, persons of ordinary skill in the art will recognize that the handle 50 may be of any size or shape known in the art. Although, preferably, the handle 50 increases the contact area to make it easier to downwardly displace the pull cord 48 in an emergency. A linkage system 52 facilitates activation of the water flow from the inlet 24 to the shower head 44 when the emergency shower 10, 10' activates.

At least initially, as shown best in FIGS. 1, 3, 9, 11, the shower head arm 42 is pulled upwardly or otherwise retained in a general vertical position. In the embodiments disclosed with respect to FIGS. 1-3, the shower head arm 42 is coupled to a spring 54 (e.g., a coil spring or extension spring), which generally spring-biases the shower head arm 42 in an upright or non-use position, as shown. In the embodiment shown with respect to FIGS. 1 and 3, the spring 54 generally pulls the shower head arm 42 upward in a generally counterclockwise direction. In one embodiment, the spring 54 couples approximately to the mid-point of the shower head arm 42 and to a point on a wall 56 relatively higher than the emergency shower head 10 to provide sufficient spring action movement. Although, the spring 54 may attach to other portions of the shower head arm 42 and the wall 56 (or other surface) as needed or desired. In FIGS. 1-3, the spring 54 is shown coupled to the shower head arm 42 at the same location where the pull cord 48 attaches to the shower head arm 42. In this respect, the spring 54 and the pull cord 48 may each individually attach to the shower head arm 42, or the spring 54 and the pull cord 48 may both attach to a common attachment, such as by way of an attachment ring 58, as shown. Downward displacement of the pull cord 48 causes downward or clockwise pivoting movement of the shower head arm 42 from the generally vertical position shown in FIGS. 1 and 3 to the generally horizontal position generally shown in FIG. 2. Here, the emergency shower 10 is activated such that water can flow out through the shower head 44, as disclosed herein. Of course, the spring 54 stretches to accommodate such movement. The tensioned spring 54 may cause the shower head arm 42 to pivot back (i.e., counterclockwise) to the generally vertical position shown in FIGS. 1 and 3 when the pull cord 48 is released. In this position, water flow through the shower head 44 stops, as discussed in more detail below.

Figure 9:
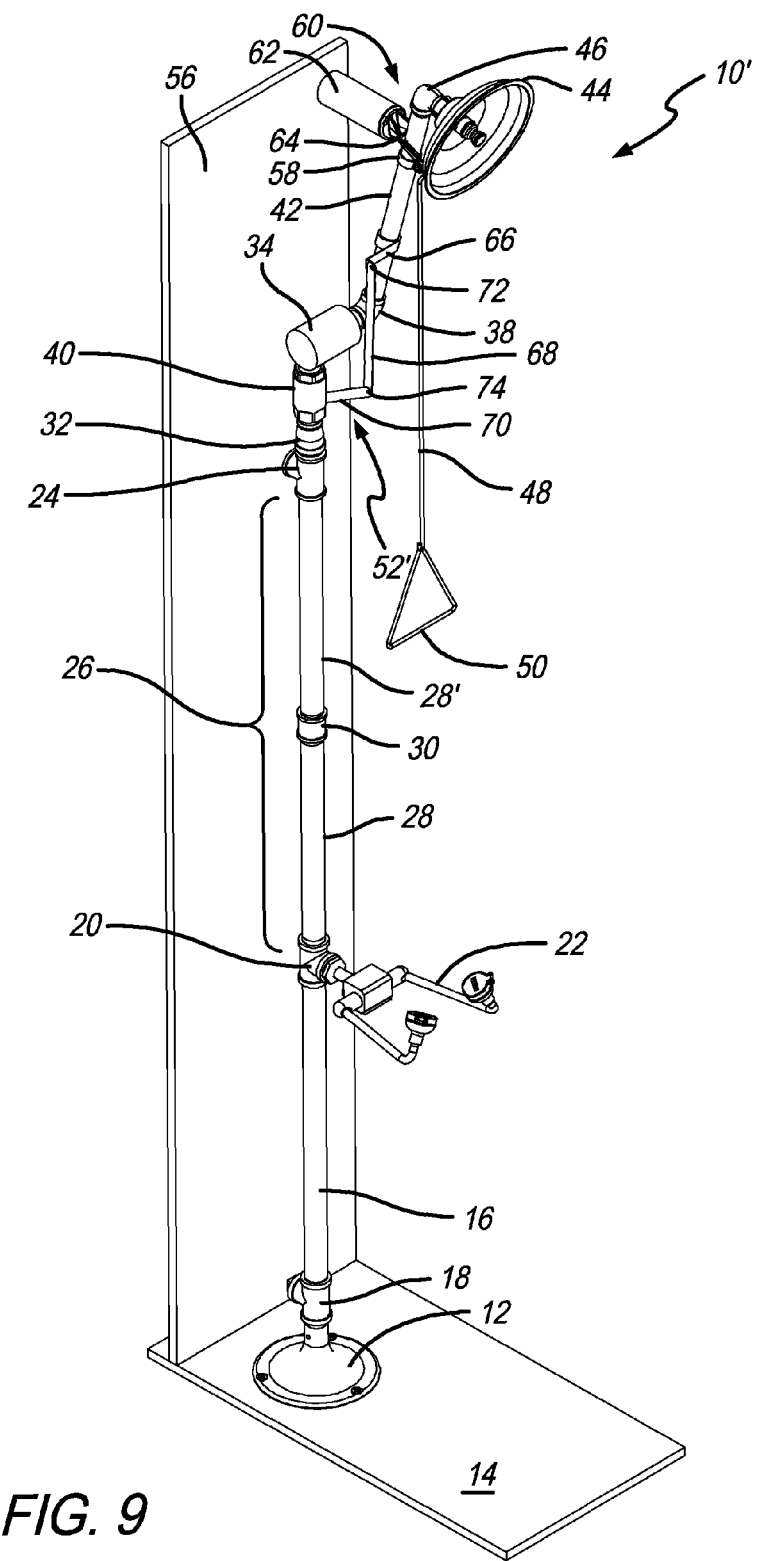
FIG. 9 is a perspective view of an alternative embodiment of an emergency shower with improved valve actuation, illustrating a clip holding the shower head arm in the first non-use position.
Figure 10:
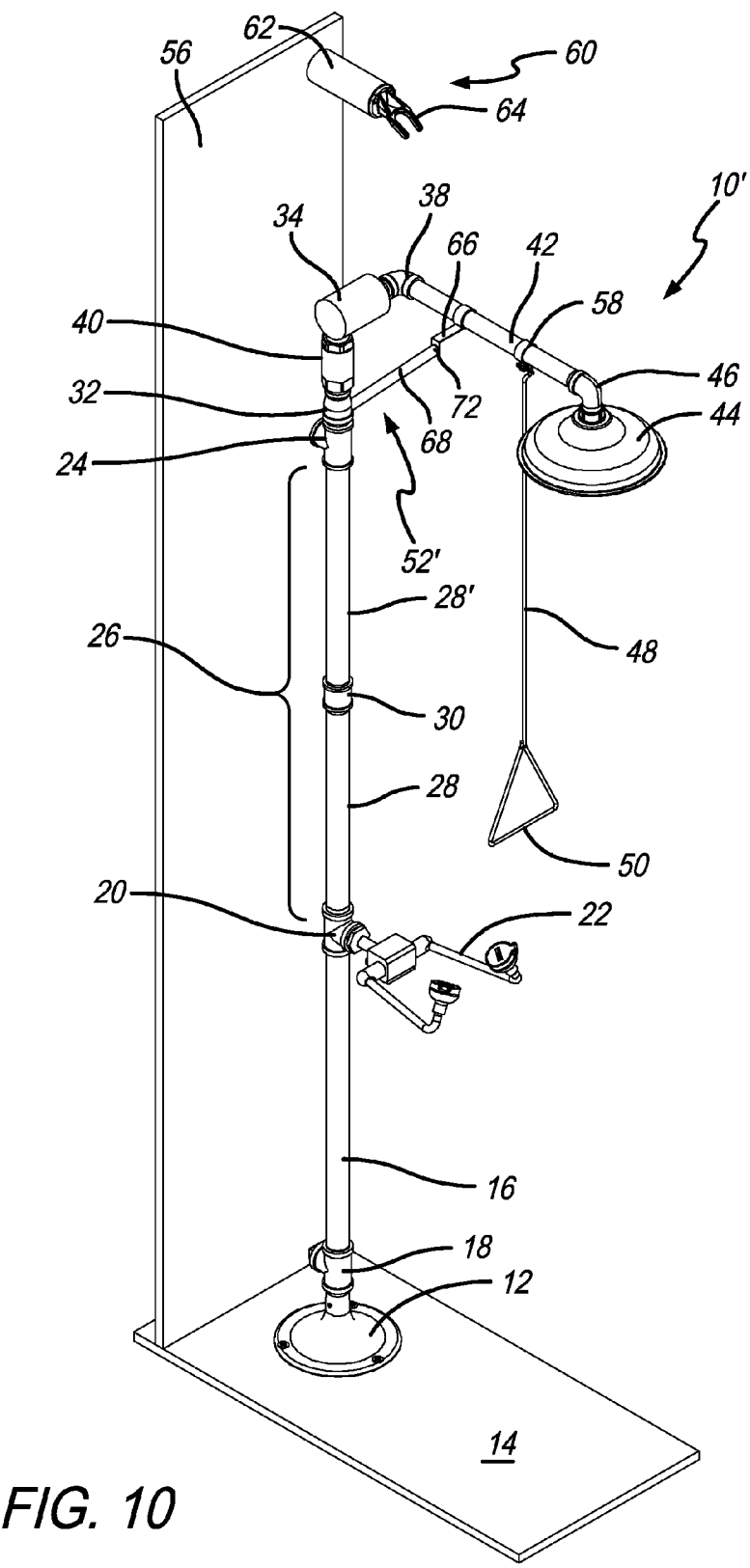
FIG. 10 is a perspective view similar to FIG. 9, further illustrating clip disengagement after the shower head arm is pivoted to the second deployed position.

Alternatively, as shown in FIGS. 9 and 10, the spring 54 may be replaced with a clip 60 that includes a cylindrical extension 62 having a U-shaped grip 64 extending therefrom. In this embodiment, the U-shaped grip 64 is of a size and shape configured to initially grasp and retain the shower head arm 42 in the generally vertical non-use position shown in FIG. 9. The grip 64 may include a non-slip surface and its opening may be somewhat smaller in size relative to the outside diameter of the shower head arm 42 and somewhat deformable such that the U-shaped grip 64 remains in friction fit engagement with the shower head arm 42 until the pull cord 48 is displaced downwardly, at which point the U-shaped grip 64 releases the shower head arm 42. In this embodiment, the pull cord 48 may only need to be displaced a short distance before the shower head arm 42 is pulled out from engagement with the U-shaped grip 64. Full release from the clip 60 allows the shower head arm 42 to more freely pivot into the position generally shown in FIG. 10. Here, the shower head 44 remains substantially horizontal even after release of the pull cord 48. In other words, the shower head arm 42 does not automatically retract upwardly toward the wall 56 after being pivoted to the horizontal or deployed position shown in FIG. 10, even if the user releases the pull cord 48. This can be advantageous and enhance safety in the event the pull cord 48 cannot be continually displaced downwardly during an emergency.

Additionally, in this embodiment, the weight of the shower head arm 42, the shower head 44, and other components (e.g., the elbows 38, 46) may help pivot the shower head arm 42 to the full operative horizontal position shown in FIG. 10 after release from the U-shaped grip 64, even if the pull cord 48 is released beforehand.

Figure 4:
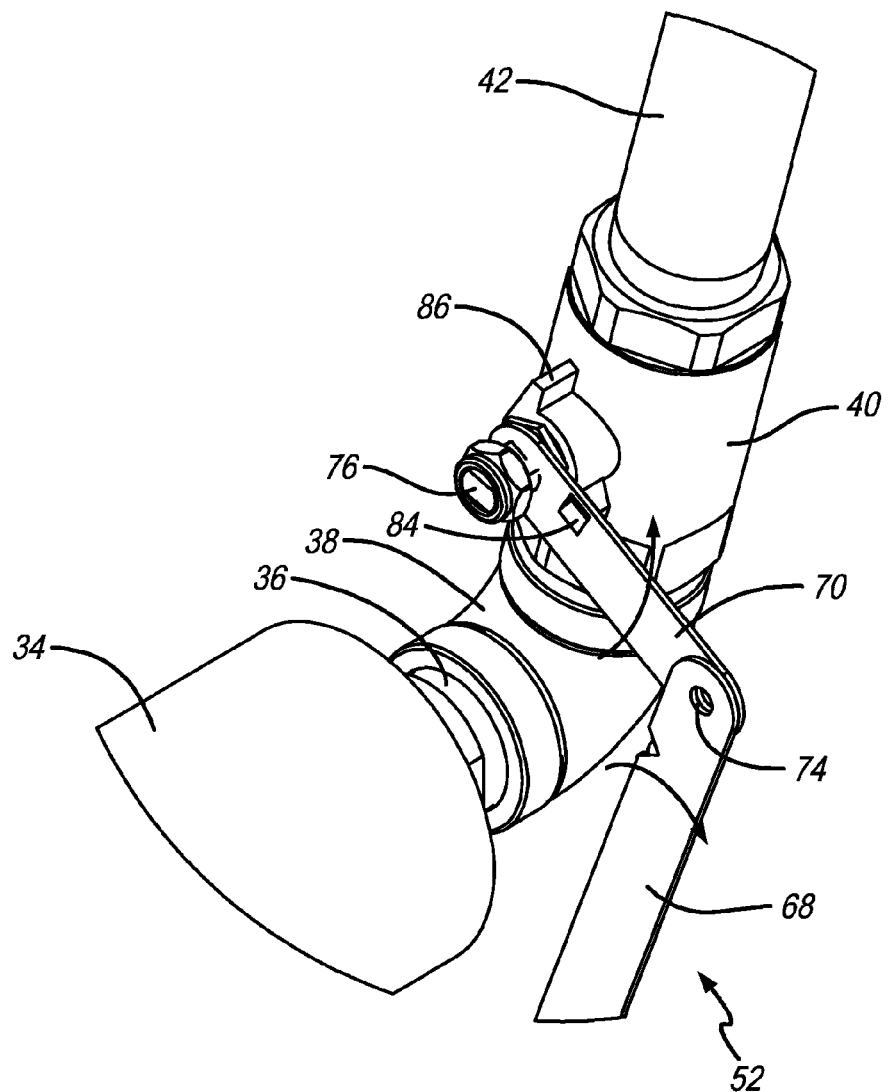
FIG. 4 is an enlarged perspective view of a linkage system for actuating a ball valve when a shower head arm pivots from a first non-use position to a second deployed position, generally taken about the circle 4 in FIG. 1.
Figure 5:
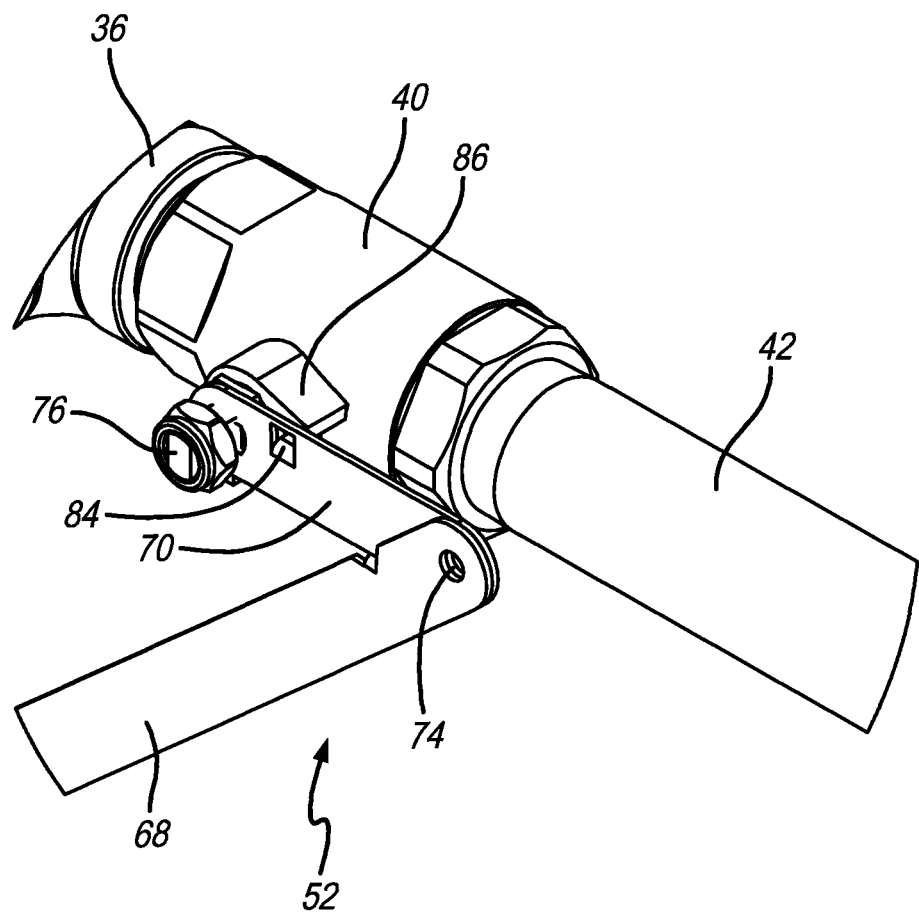
FIG. 5 is an enlarged perspective view of the linkage system generally taken about the circle 5 in FIG. 2, in the second deployed position.
Figure 6:
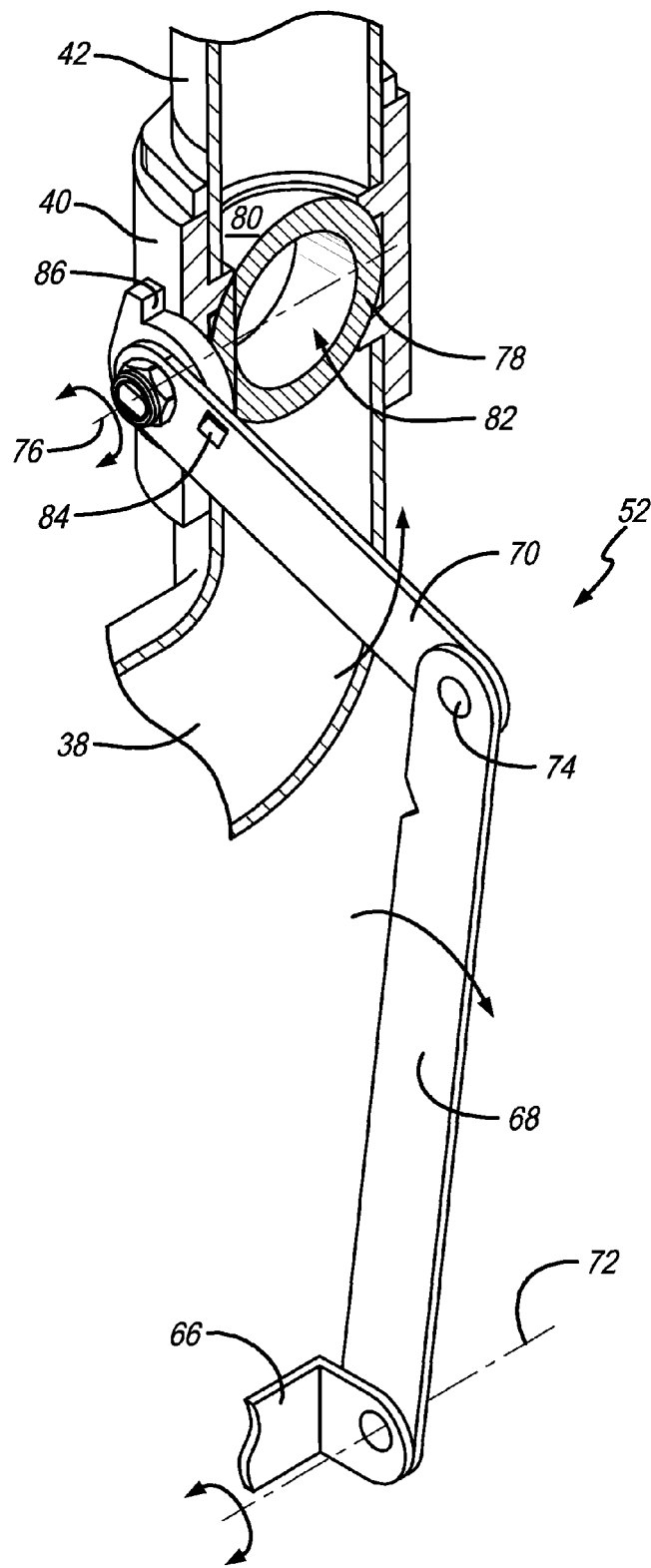
FIG. 6 is an enlarged perspective view similar to FIG. 4, more specifically illustrating a partial cut-away of a ball valve in a closed position when the emergency shower is in the first non-deployed position.
Figure 7:
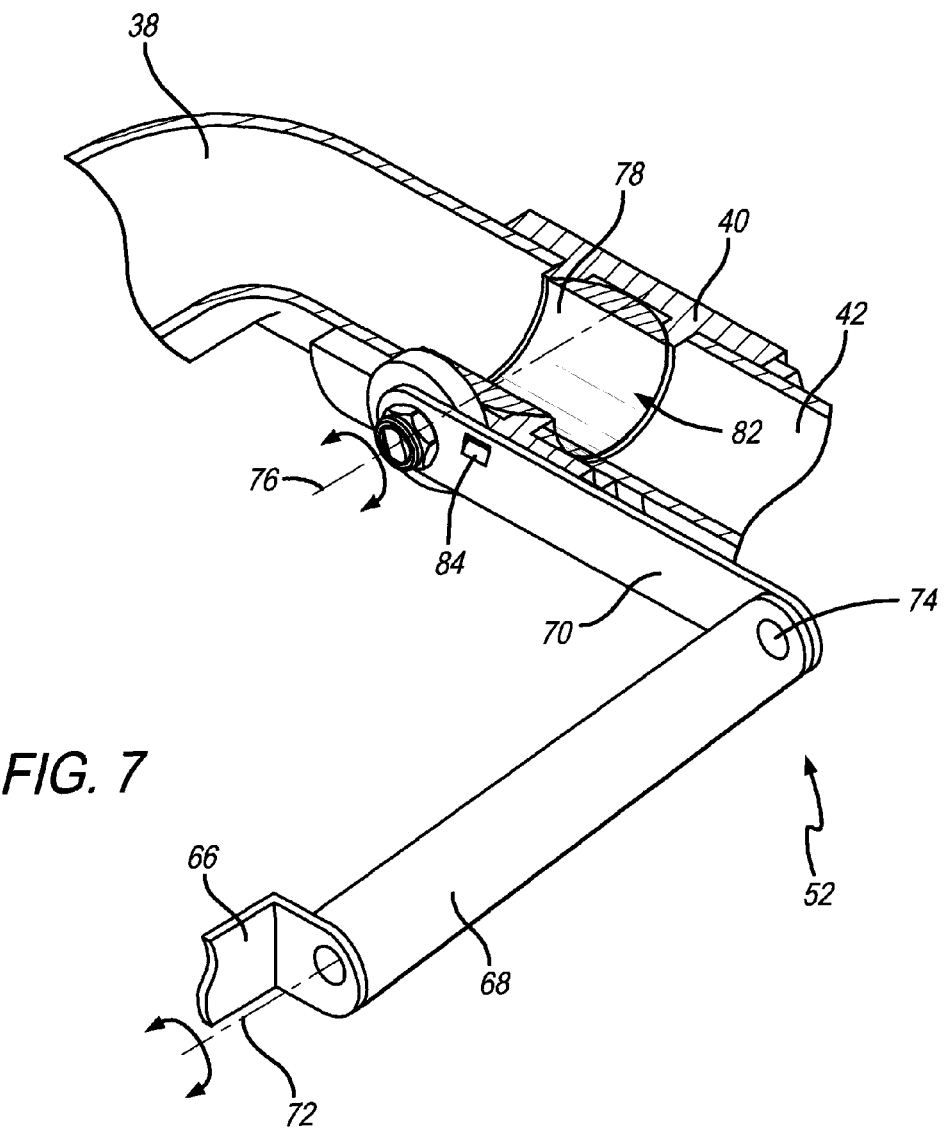
FIG. 7 is an enlarged perspective view similar to FIG. 5, more specifically illustrating the ball valve in an open position when the emergency shower is in the second deployed position.

Activation of the emergency shower 10 is shown in more detail with respect to the operation of the linkage system 52. In this respect, FIGS. 1-7 illustrate one embodiment of the linkage system 52, including an offset bracket 66 statically extending outwardly and away from the vertical extension pipe 26 and generally parallel with the rotary union 34. The offset bracket 66 pivotally couples at the other end with a first relatively longer link 68, which pivotally couples to a second relatively shorter link 70 that pivotally couples directly to the ball valve 40, for operation therewith. Accordingly, as best shown in FIGS. 4-7, clockwise pivoting of the shower head arm 42, such as when the pull cord 48 is downwardly displaced, causes forward or clockwise pivoting of the first link 68 about a pivot through a bracket axis 72 formed by its connection with the static offset bracket 66. At that same time, such clockwise pivoting of the first link 68 pushes forward along a link pivot 74 coupled with the second link 70, thereby causing the second link 70 to pivot counterclockwise about a ball valve pivot axis 76. The second shorter link 70 statically couples to an arm (not numbered) pivotally coupled to an internally placed ball valve 78 such that counterclockwise movement of the shorter link 70 about the ball valve pivot axis 76 causes concurrent counterclockwise pivoting movement of the ball valve 78, shown disposed within the interior of the ball valve unit 40 in the partial cut-away perspective views of FIGS. 6 and 7. Initially, as shown in FIG. 6, when the shower head arm 42 is in the generally vertical position, the ball valve 78 resides within the ball valve unit 40 in a position to block flow through the ball valve unit 40. As shown in FIG. 6, the ball valve 78 includes an outer housing or surface 80 positioned within the ball valve unit 40 to occlude water flow therethrough when the shower head arm 42 is in the first generally vertical or non-use position shown in FIGS. 1 and 3. Accordingly, the aperture 82 is generally positioned perpendicular to the flow of water and thus is not in fluid communication with the elbow 38 or the shower head arm 42. Clockwise pivoting movement of the shorter link 70, resulting from movement of the shower head arm 42 from the generally vertical position (FIG. 6) to the horizontal position (FIG. 7), causes commensurate rotational movement of the ball valve 78 within the ball valve unit 40 by way of being statically linked to the pivoting shorter link 70. As shown in FIG. 7, the aperture 82 now substantially axially aligns with the conduit formed by the elbow 38 and the shower head arm 42, to permit water to flow therethrough. Accordingly, the ball valve unit 40 in the shower head arm 42 initially occludes flow when the emergency shower 10 is in the first non-use position, and then pivots to a flow permitting position (best shown in FIG. 7) when the emergency shower 10 is positioned into the second use position.

The second or relatively shorter link 70 may include an inwardly projecting stop or tab 84 having a size and shape for select engagement with a step or ledge 86 that pivots with the shower head arm 42. In this respect, the ledge 86 is typically about parallel with the length of the shower head arm 42 and pivots therewith and relative to the second shorter link 70, and in particular, relative to the inwardly projecting tab 84. FIGS. 4 and 6 initially show the tab 84 disengaged or offset from the ledge 86. But, pivoting the shower head arm 42 approximately ninety degrees causes the tab 84 to pivot into engagement with the ledge 86, as generally shown in FIGS. 5 and 7. This, accordingly, stops clockwise pivoting movement of the shower head arm 42, and preferably terminates such pivoting movement wherein the shower head 44 is in the general horizontal position outstretched away from the wall 56 such that water dispenses from the shower head 44 on anyone standing underneath. Here, the ball valve 78 also preferably pivots approximately ninety degrees within the ball valve unit 40 from the flow occluding position shown in FIG. 6 to the maximum flow permitting position shown in FIG. 7. In the maximum flow permitting position shown in FIG. 7, the aperture 82 is preferably concentrically aligned within the interior of the ball valve unit 40 so as to provide no or low flow restriction.

Figure 8:
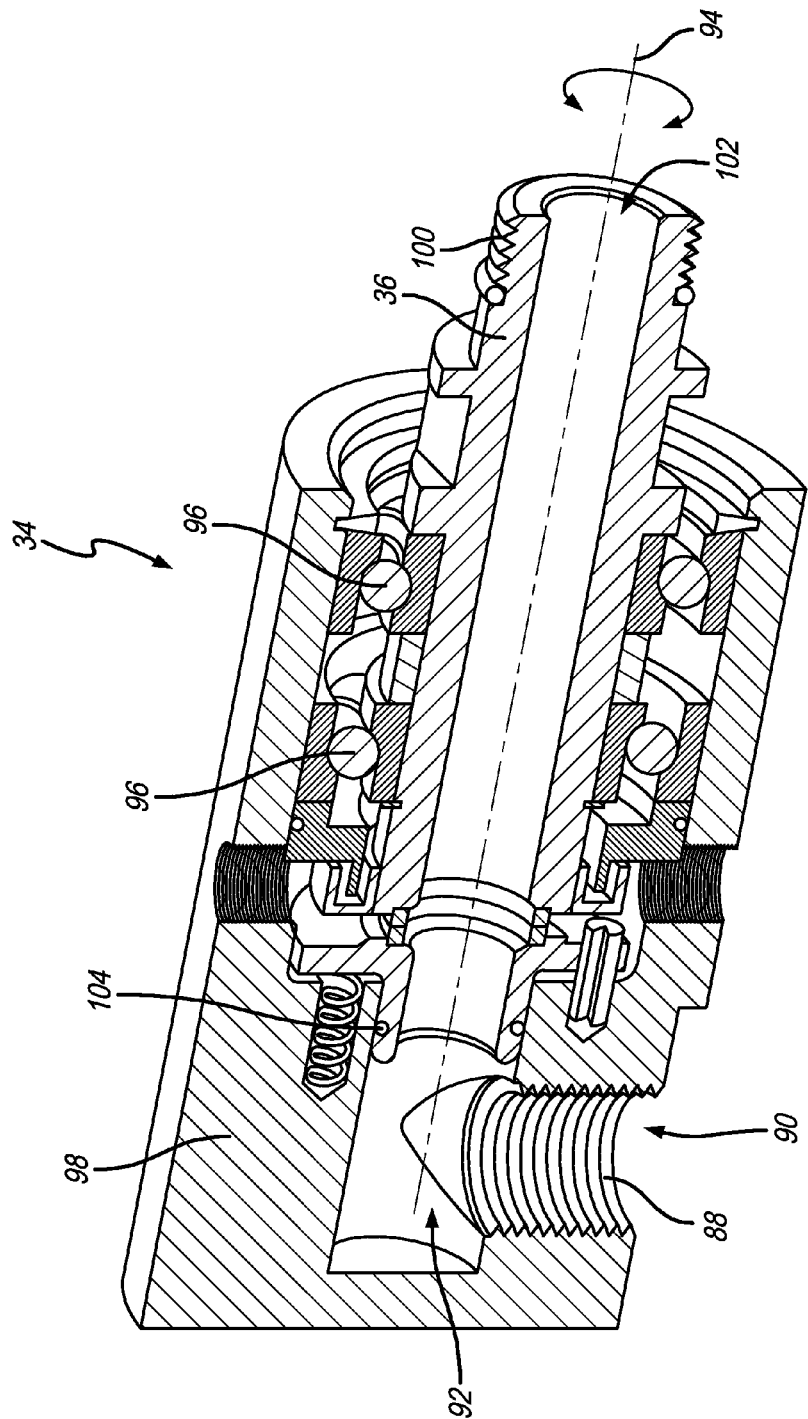
FIG. 8 is a cross-sectional view of a rotary union permitting pivoting movement of the shower head arm between the first non-use position and the second deployed position, taken generally about the line 8-8 in FIG. 2.

As shown best in FIG. 8, the rotary union 34 includes a set of internal threads 88 that threadingly engage a reciprocal set of threads of the adapter 32, for water-tight engagement therewith. The internal threads 88 are formed in an inlet 90 that extends upwardly into a bored out section or conduit 92 in fluid communication with the rotor 36. The rotor 36 moves about an axis 94 by way of a series of ball bearings 96 mounted within a housing 98 of the rotary union 34. The rotor 36 includes a series of threads 100 at an outlet 102 configured for threaded engagement with the elbow 38 for water-tight engagement therewith. An O-ring 104 may help seal the rotor 36 relative to the conduit 92 in water-tight relation. In operation, the rotor 36 is allowed to pivot concentrically about the axis 94 and relative to the housing 98 by way of the ball bearings 96. Consequently, static coupling of the rotor 36 to the elbow 38, which turns outwardly and away from, e.g., the wall 56, permits the shower head arm 42 to pivot from the general vertical position shown in FIGS. 1 and 3 to the general horizontal position shown in FIG. 2, i.e., the position wherein the ledge 86 terminates pivoting movement by way of engagement with the inwardly extending tab 84.

FIGS. 9-12 illustrate an alternative embodiment of the emergency shower 10' as disclosed herein. Similar to the above, the emergency shower 10' may also be a generally vertically free-standing unit that includes the base 12 bolted or otherwise attached to the floor surface 14. The vertical pipe 16 having the T-shaped optional bottom inlet 18 extends generally upwardly from the base 12. The optional bottom inlet 18 may selectively couple to a water source to provide water to the emergency shower 10' during use. Connected to the top of the pipe 16 in fluid flow relation is the generally T-shaped coupler 20 having the eyewash unit 22 extending therefrom. Of course, the eyewash unit 22 is optional, depending on the desired configuration of the emergency shower 10 or 10'. In the embodiment wherein the emergency shower 10, 10' includes the eyewash unit 22, it is preferably in fluid communication with the inlet 24 by way of a vertical extension pipe 26 that may include one or more pipe sections 28 or the like connected together in fluid flow relationship by one or more corresponding couplers 30. Similar to the embodiment illustrated in FIG. 1, the emergency shower 10' shown in FIGS. 9 and 10 includes two pipe sections 28, 28', with the pipe section 28' coupling at one end to the generally T-shaped inlet 24 for receiving an inflow of pressurized water from, e.g., a mains water supply at the inlet 24, and coupling to the coupler 30 at the other end. The other pipe section 28 fluidly couples to the coupler 30 on one end and then to the T-shaped coupler 20 at the other. This way, pressurized water entering the emergency shower 10' through the inlet 24 may be directed to and dispensed from the eyewash unit 22 during use. For example, when the emergency shower 10' is activated, water pressure within the vertical extension pipe 26 may transfer to the T-shaped coupler 20 and out from the eyewash unit 22 when the eyewash unit 22 is pivoted from the upright position shown in FIG. 9 to an extended or open position shown in FIG. 10. Here, water may dispense from the eyewash unit 22.

As briefly mentioned above, and similar to the embodiments disclosed with respect to FIGS. 1-3, the inlet 24 couples at one end to the pipe section 28' for delivering pressurized water flow to the lower portion of the emergency shower 10 by way of the vertical extension pipe 26. On an opposite side, the inlet 24 couples to the a relatively short adapter 32 that includes a pipe fitting on one end for engagement with the inlet 24 in pressurized fluid flow relation, and another fitting on an opposite end that couples to the ball valve 40. The ball valve 40, in this embodiment, pivots between closed and open positions to restrict or permit water flow to the rotary union 34, which delivers the pressurized water flow to the shower head arm 42 by way of the elbow 38. In other words, the ball valve unit 40 in this embodiment is positioned in line with the vertical extension pipe 26 as opposed to being in line with the shower head arm 42.

Figure 11:
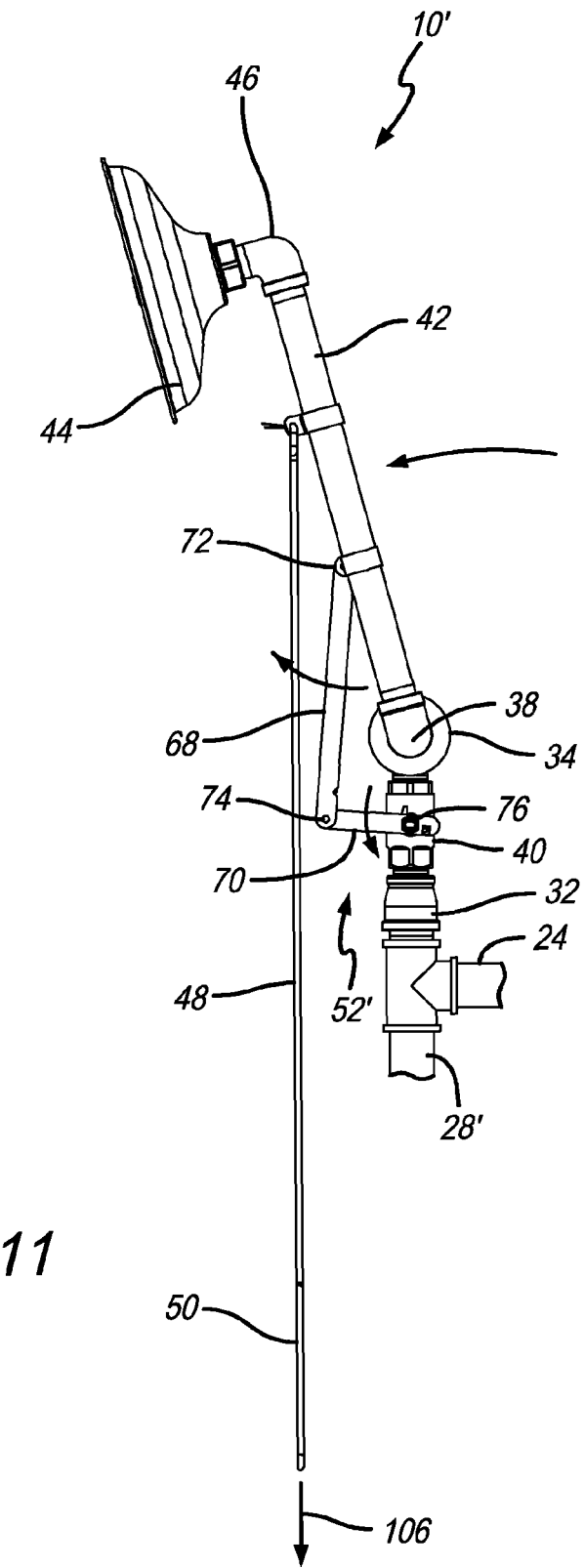
FIG. 11 is a right side view of the alternative emergency shower of FIG. 9, further illustrating the ball valve in line with a vertical inlet conduit.

Accordingly, in this embodiment, FIGS. 9-12 illustrate another configuration of the linkage system 52', wherein the offset bracket 66 statically extends outwardly and away from the shower head arm 42 and generally parallel with the rotary union 34. Similar to the above, the offset bracket 66 pivotally couples with the first relatively longer link 68, which is pivotally coupled with the second relatively shorter link 70—the link 70 then couples directly to the ball valve 40 mounted just above the adapter 32, for operation therewith. Accordingly, as best shown in FIG. 11, counterclockwise pivoting of the shower head arm 42, such as when the pull cord 48 is downwardly displaced along the directional arrow 106, causes forward or clockwise pivoting movement of the first link 68 about a pivot through the bracket axis 72 formed by its connection with the offset bracket 66, by way of being pivotally coupled relative to the shower head arm 42. At that same time, such clockwise pivoting movement of the first link 68 pushes backward along the link pivot 74 coupled with the second link 70, thereby causing the second link 70 to pivot counterclockwise about the ball valve pivot axis 76. The second relatively shorter link 70 couples directly to an arm (not numbered) pivotally coupled to the internally placed ball valve 78 such that counterclockwise movement of the shorter link 70 about the ball valve pivot axis 76 causes concurrent counterclockwise pivoting movement of the ball valve 78, in accordance with the embodiments described herein.

Figure 12:
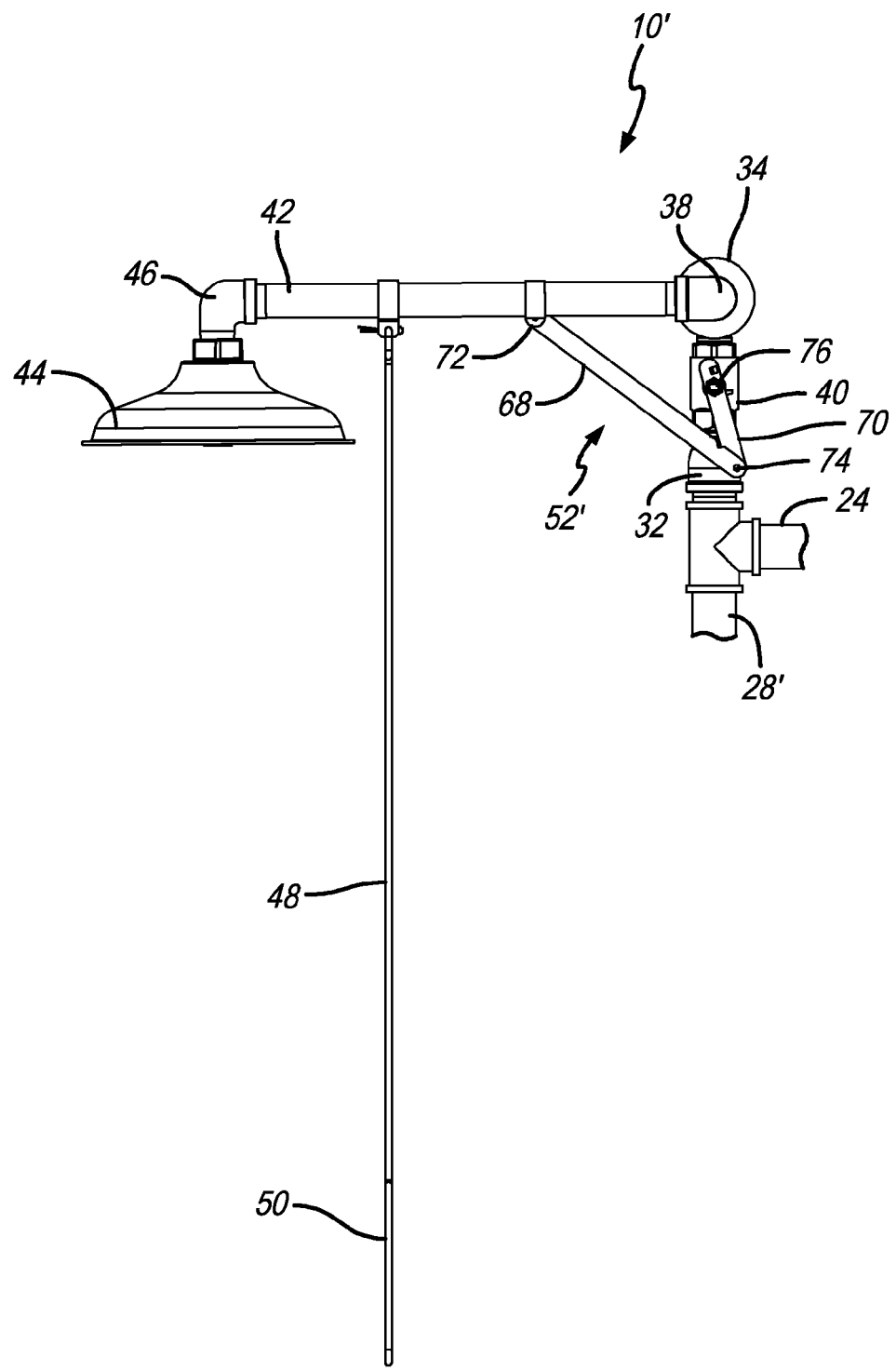
FIG. 12 is a right side view similar to FIG. 11, illustrating the linkage system moving the ball valve from the first closed position to the second open position when the shower head arm pivots from the generally vertical position shown in FIG. 11 to the generally horizontal position shown in FIG. 12.

Initially, as shown in FIGS. 9 and 11, when the shower head arm 42 is in the generally vertical position, the ball valve 78 resides within the ball valve unit 40 in a position to block flow therethrough, e.g., wherein the surface 80 is in a flow restricting position similar to that shown in FIG. 6. Clockwise pivoting movement of the shorter link 70, resulting from movement of the shower head arm 42 from the generally vertical position (FIGS. 9 and 11) to the horizontal position (FIGS. 10 and 12), causes commensurate pivoting movement of the ball valve 78 within the ball valve unit 40 by way of being linked directly to the pivoting shorter link 70. Once the shower head arm 42 is in the horizontal position as shown in FIGS. 10 and 12, the aperture 82 substantially axially aligns within the vertical conduit formed between the adapter 32 and the rotary union 34, to permit water to flow therethrough. Accordingly, the ball valve unit 40 initially occludes flow when the emergency shower 10 is in the first non-use position, and then pivots to a flow permitting position when the emergency shower 10' is positioned into the second deployed position, such that pressurized water flow may travel through the rotary union 34, the interconnected elbow 38, the shower head arm 42, and out through the shower head 44.

Similar to the above, the second or relatively shorter link 70 preferably includes the inwardly projecting stop or tab 84 having a size and shape for select engagement with a non-rotating step or ledge 86 coupled with the ball valve unit 40. In this embodiment, the ledge 86 may be generally parallel with the vertical extension pipe 26 and otherwise remains in static relation relative thereto during pivoting movement of the shower head arm 42. As described above, pivoting the shower head arm 42 causes movement of the second relatively shorter link 70, with the tab 84 thereon, to pivot into engagement with the ledge 86. The ledge 86, accordingly, stops the clockwise pivoting movement of the shower head arm 42, and preferably terminates such pivoting when the shower head 44 is in a general horizontal position outstretched away from the wall 56 to dispense water over anyone standing underneath. Here, the ball valve 78 preferably pivots within the ball valve unit 40 to a maximum flow permitting position, such as when the aperture 82 is concentrically aligned within the interior of the ball valve unit 40.

In the embodiment disclosed with respect to FIGS. 9-12, the set of internal threads 88 of the rotary union 34 threadingly engage a reciprocal set of threads of the ball valve unit 40, for water-tight engagement therewith. Accordingly, when the ball valve 78 pivots to the flow permitting position, pressurized water is allowed to travel through the ball valve unit 40 and into the inlet 90, through the conduit 92 and into the rotor 36 where the water eventually exits the rotary union 34 into the elbow 38 through the outlet 102. Similar to the above, the rotor 36 moves about the axis 94 by way of the ball bearings 96 mounted within the housing 98 of the rotary union 34. The threads 100 at the outlet 102 threadingly engage the elbow 38 in water-tight relation. The O-ring 104 helps seal the rotor 36 relative to the conduit 92 in water-tight relation. In operation, the rotor 36 pivots concentrically about the axis 94 and relative to the housing 98 by way of the ball bearings 96. Consequently, static relative coupling of the rotor 36 to the elbow 38, which turns outwardly away from, e.g., the wall 56, permits the shower head arm 42 to pivot from the general vertical position shown in FIGS. 9 and 11, to the general horizontal position shown in FIGS. 10 and 12, i.e., the position wherein the ledge 86 terminates pivoting movement by way of engagement with the inwardly extending tab 84. Here, the shower head 44 dispenses water from the emergency shower 10 in accordance with the embodiments disclosed herein, namely when the shower head arm 42 is pivoted from the non-use position (FIGS. 9 and 11) to the use position (FIGS. 10 and 12), such as by way of pulling down on the generally downwardly hanging pull cord 48. Once deployed, the shower head arm 42 remains in the horizontal position shown in FIGS. 10 and 12 so that a constant stream of pressurized water continues to exit the shower head 44 during the emergency.

Although several embodiments have been described in detail for purposes of illustration, various modifications may be made without departing from the scope and spirit of the invention. Accordingly, the invention is not to be limited, except as by the appended claims.

What is claimed is:

1. An emergency shower with improved valve actuation, comprising:
    a shower head arm pivotable between a first non-use position and a second deployed position for dispensing water out therefrom;
    a rotary union coupled relative to the shower head arm to permit pivotable movement thereof between the first non-use position and the second deployed position;
    a ball valve positionable between a first flow restricting position when the shower head arm is in the first non-use position and a second flow permitting position when the shower head arm pivots about the rotary union to the second deployed position; and
    a linkage system having a first link pivotally coupled relative to the shower head arm and movable therewith between the first non-use position and the second deployed position and a second link pivotally coupled with the ball valve and responsive to movement of the first link with the shower head arm, the second link positioning the ball valve in the first flow restricting position when the shower head arm is in the first non-use position and commensurately moving of the ball valve to the second flow permitting position when the shower head arm is pivoted to the second deployed position.

2. The emergency shower of claim 1, wherein one of the first link or the second link includes a projecting tab that pivots relative to and selectively engages a ledge that terminates pivoting movement of the shower head arm from the first non-use position to the second deployed position.

3. The emergency shower of claim 2, wherein the projecting tab and the ledge are rotatably offset by approximately 90 degrees when the shower head arm is in the first non-use position.

4. The emergency shower of claim 1, wherein the first link pivots clockwise and the second link pivots counterclockwise with movement of the shower head arm from the first non-use position to the second deployed position.

5. The emergency shower of claim 1, wherein the rotary union is generally positioned perpendicular to the shower head arm in both the first non-use position and the second deployed position.

6. The emergency shower of claim 5, wherein one of the first link or the second link is pivotally coupled relative to an extension bracket generally parallel with the rotary union.

7. The emergency shower of claim 1, including a clamp retaining the shower head arm in the first non-use position and selectively releasing the shower head arm for deployment to the second deployed position.

8. The emergency shower of claim 7, wherein the clamp comprises a U-shaped grip having a deformable inner diameter relatively smaller than an outside diameter of the shower head arm.

9. The emergency shower of claim 8, wherein the inner diameter includes a non-slip surface.

10. The emergency shower of claim 1, wherein at least a portion of the shower head arm includes the ball valve.

11. The emergency shower of claim 1, wherein the rotary union is positioned intermediate the ball valve and the shower head arm.

12. The emergency shower of claim 1, including a spring generally biasing the shower head arm in the first non-use position and resistive to movement to the second deployed position.

13. The emergency shower of claim 1, including an inlet that selectively couples to a mains water supply and is in fluid communication with the shower head arm, the rotary union, and the ball valve.

14. An emergency shower with improved valve actuation, comprising:
    a discharge outlet pivotable between a first non-use position and a second deployed position for dispensing water out through a shower head;

a rotary union generally perpendicularly coupled relative to the discharge outlet to permit pivotable movement thereof between the first non-use position and the second deployed position;

a ball valve positionable between a first flow restricting position when the discharge outlet is in the first non-use position and a second flow permitting position when the discharge outlet pivots to the second deployed position;

a linkage system having a first link pivotally coupled relative to the discharge outlet and movable clockwise therewith between the first non-use position and the second deployed position and a second link pivotally coupled with the ball valve and responsive to movement of the first link with the discharge outlet in a counterclockwise direction between the first non-use position and the second deployed position, the second link positioning the ball valve in the first flow restricting position when the discharge outlet is in the first non-use position and commensurately moving of the ball valve to the second flow permitting position when the discharge outlet is pivoted to the second deployed position; and a tab extending out from one of the first link or the second link that pivots relative to and selectively engages a stop, engagement of the tab with the stop terminates pivoting movement of the discharge outlet in the second deployed position.

15. The emergency shower of claim 14, wherein the tab and the stop are rotatably offset by approximately 90 degrees when the discharge outlet is in the first non-use position.

16. The emergency shower of claim 14, including a clamp retaining the discharge outlet in the first non-use position and selectively releasing the discharge outlet for deployment to the second deployed position, wherein one of the first link or the second link is pivotally coupled relative to an extension bracket generally parallel with the rotary union.

17. The emergency shower of claim 16, wherein the clamp comprises a U-shaped grip having a deformable inner diameter relatively smaller than an outside diameter of the discharge outlet.

18. The emergency shower of claim 17, wherein the deformable inner diameter includes a non-slip surface and at least a portion of the discharge outlet includes the ball valve.

19. The emergency shower of claim 14, including an extension spring generally biasing the discharge outlet in the first non-use position and resistive to movement to the second deployed position and an inlet that selectively couples to a mains water supply and is in fluid communication with the discharge outlet, the rotary union, and the ball valve, wherein the rotary union is positioned intermediate the ball valve and the discharge outlet.

20. An emergency shower with improved valve actuation, comprising:

a shower head arm pivotable between a first non-use position and a second deployed position for dispensing water out therefrom;

a rotary union coupled relative to the shower head arm to permit pivotable movement thereof between the first non-use position and the second deployed position;

a ball valve positionable between a first flow restricting position when the shower head arm is in the first non-use position and a second flow permitting position when the shower head arm pivots about the rotary union to the second deployed position;

a linkage system having a first link pivotally coupled relative to the shower head arm and movable therewith between the first non-use position and the second deployed position and a second link pivotally coupled with the ball valve and responsive to movement of the first link with the shower head arm, the second link positioning the ball valve in the first flow restricting position when the shower head arm is in the first non-use position and commensurately moving of the ball valve to the second flow permitting position when the shower head arm is pivoted to the second deployed position, wherein one of the first link or the second link is pivotally coupled relative to an extension bracket generally parallel with the rotary union;

a clamp retaining the shower head arm in the first non-use position and selectively releasing the shower head arm for deployment to the second deployed position; and an inlet that selectively couples to a mains water supply and is in fluid communication with the shower head arm, the rotary union, and the ball valve.

21. The emergency shower of claim 20, wherein one of the first link or the second link includes a projecting tab that pivots relative to and selectively engages a ledge that terminates pivoting movement of the shower head arm from the first non-use position to the second deployed position and wherein the first link pivots clockwise and the second link pivots counterclockwise with movement of the shower head arm from the first non-use position to the second deployed position.

22. The emergency shower of claim 21, wherein the projecting tab and the ledge are rotatably offset by approximately 90 degrees when the shower head arm is in the first non-use position and wherein the clamp comprises a U-shaped grip having a deformable inner diameter relatively smaller than an outside diameter of the shower head arm.

23. The emergency shower of claim 22, wherein the inner diameter includes a non-slip surface and wherein at least a portion of the shower head arm includes the ball valve.

24. The emergency shower of claim 20, wherein the rotary union is generally positioned perpendicular to the shower head arm in both the first non-use position and the second deployed position and wherein the rotary union is positioned intermediate the ball valve and the shower head arm.

* * * * *